United States Patent [19]
Buckley et al.

[11] 4,434,262
[45] Feb. 28, 1984

[54] MELT PROCESSABLE BLEND OF A LOW MOLECULAR WEIGHT LIQUID CRYSTALLINE COMPOUND AND A POLYOLEFIN OR POLYESTER

[75] Inventors: Alan Buckley, Berkeley Heights; Anthony B. Conciatori, Chatham; Gordon W. Calundann, N. Plainfield, all of N.J.

[73] Assignee: Celanese Corporation, New York, N.Y.

[21] Appl. No.: 413,912

[22] Filed: Sep. 1, 1982

[51] Int. Cl.$^3$ .......................... C08K 5/29; C08K 5/06
[52] U.S. Cl. .................................... 524/237; 524/290; 524/394; 524/585; 524/605
[58] Field of Search ............... 524/290, 394, 246, 585, 524/605, 237

[56] References Cited

U.S. PATENT DOCUMENTS 3,974,114 8/1976 Sowa ..................................... 524/394
4,344,874 8/1982 Akagi et al. .......................... 524/394
4,351,751 9/1982 Kishida et al. ....................... 524/394

*Primary Examiner*—Lewis T. Jacobs
*Attorney, Agent, or Firm*—Burns, Doane, Swecker & Mathis

[57] ABSTRACT

An improved melt processable blend is provided comprised of a polymer selected from the group consisting of a polyolefin and a polyester and a low molecular weight liquid crystalline compound which is capable of forming an anisotropic melt phase at the melt processing temperature of the blend.

29 Claims, No Drawings

MELT PROCESSABLE BLEND OF A LOW MOLECULAR WEIGHT LIQUID CRYSTALLINE COMPOUND AND A POLYOLEFIN OR POLYESTER

BACKGROUND OF THE INVENTION

The present invention relates to a blend of a polyolefin or polyester and a melt processable low molecular weight liquid crystalline compound.

U.K. Published Patent Application 2,008,598 discloses a polymer composition comprising 20 percent or less, based upon the total weight of polymeric material, of a first rigid polymeric material with the balance being a second polymeric material composed substantially of flexible molecular chains. The first polymeric material is dispersed in the second polymeric material in a microscope region of one um. or less. Foreign counterparts of this application include Japanese application No. 54065747, French application No. 2407956, West German application No. 2847782, and U.S. Pat. No. 4,228,218.

European Patent Application No. 0030417 discloses the addition of a liquid crystalline polymer to at least one other melt processable polymer (e.g., a polyester) to improve the melt processability thereof. British Patent Application No. 8017685 discloses the addition of a liquid crystalline polymer to polytetrafluoroethylene. British Patent Application No. 8035800 describes the addition of a liquid crystalline polymer to a nonliquid crystalline polymer.

It is, however, desirable, to provide a method by which the viscosity of melt processable polymers such as polyolefins and polyesters can be modified while minimizing the effect upon the mechanical properties of the polymer by addition of nonpolymeric compounds thereto. Such viscosity modification will desirably result in processing and/or productivity advantages such as lower processing temperatures and pressures, faster extrusion rates, etc.

SUMMARY OF THE INVENTION

In accordance with the present invention, there is thus provided a melt processable blend which possesses the ability to form shaped articles having satisfactory mechanical properties comprising:

(a) a major amount of a melt processable polymer which is not capable of forming an anisotropic melt phase apart from the blend selected from the group consisting of a polyolefin and a polyester, and (b) a minor amount of a liquid crystalline compound having a molecular weight below about 1000 and which is capable of forming an anisotropic melt phase apart from the blend at the melt processing temperature of the blend.

In accordance with the present invention, there is also provided an improved method of melt extruding a melt processable polymer which is not capable of forming an anisotropic melt phase apart from the blend selected from the group consisting of a polyolefin and a polyester by which the melt viscosity of said polyolefin or polyester is reduced comprising providing a blend comprised of a major amount of said polyolefin or polyester and a minor amount of a low molecular weight liquid crystalline compound having a molecular weight below about 1000 and which is capable of forming an anisotropic melt phase apart from the blend at the melt processing temperature of the blend and extruding said blend.

DETAILED DESCRIPTION OF THE INVENTION

The present invention is directed to a melt processable blend of a polyolefin or polyester and a low molecular weight liquid crystalline compound. As used herein, the term "blend" includes any physical blend, mixture, or alloy of the above components.

The major component of the blend of the present invention is a melt processable polymer selected from the group consisting of a polyolefin and a polyester. These polymers are available commercially or can be prepared by known techniques. The polyolefin comprises alkylene units of two to five carbon atoms and may comprise straigth or branched chains. The alkylene units preferably contain two to four carbon atoms, and most preferably contain two carbon atoms. Thus, polyethylene is the preferred polyolefin for use in the blends of the present invention. Other suitable polyolefins include but are not limited to polybutene-1, polybutene-2, polyisobutylene, polypropylene, polypentene-1, etc.

The term "polyester" as used herein is intended to include but not be limited to high molecular weight linear polyesters obtained from at least one aliphatic, cycloaliphatic or aromatic diol and at least one aliphatic, cycloaliphatic or aromatic dicarboxylic acid. The preferred polyester is poly(ethylene terephthalate) which is obtained from ethylene glycol and terephthalic acid. Another suitable material is polybutylene terephthalate as well as those polyesters derived from polymethylene-α,ω-diols and terephthalic acid. Other suitable polyesters include but are not limited to wholly aromatic polyesters such as the copolymers of iso and/or terephthalic acid and bisphenol A.

The minor component of the blend of the present invention is a low molecular weight (non-polymeric) liquid crystalline compound. Liquid crystalline compounds are compounds which are liquid crystalline (i.e., anisotropic) in the melt phase. These compounds have been described by various terms, including "liquid crystalline," "liquid crystal" and "anisotropic." Briefly, the compounds of this class are thought to involve a parallel ordering of the molecular chains. The state wherein the molecules are so ordered is often referred to either as the liquid crystalline state or the nematic phase of the liquid crystalline material. Such properties may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under nitrogen atmosphere. The compound is optically anisotropic, i.e., it transmits light when examined between crossed polarizers. Polarized light is transmitted when the sample is optically anisotropic even in the static state.

The molecular weight of the compound is preferably below about 1000, and may be below about 500. The compound must be capable of forming an anisotropic melt at the melt processing temperature of the blend. The compounds should also not chemically react with the polyolefin or polyester component in the melt blend. In contrast to the compound, the polyolefin and polyester component are not capable of forming an anisotropic melt phase.

Exemplary low molecular weight liquid crystalline compounds include but are not limited to N,N'-bis(p-methoxybenzylidene)-alpha, alpha'-bi-p-toluidine (which is nematic at 190° C.); p-methoxycinnamic acid (which is nematic at 190° C.); N,N'-bis(4-octyloxybenzylidene)-p-phenylenediamine (which is in one of its smectic phases at 170° C.) and lithium stearate (which is smectic at 170° C.). Mixtures of the above compounds may also be employed.

The blends of the present invention comprise a major amount (i.e., greater than about 50 percent by weight) of the polyolefin or polyester component and a minor amount (i.e., less than about 50 percent by weight) of the low molecular weight liquid crystalline compound. The blend comprises approximately 50 to 99.5 percent by weight of the polyolefin or polyester component and approximately 50 to 0.5 percent by weight of the liquid crystalline compound. The above weight percentages are based upon the total weight of the two components in the blend. Preferably, the liquid crystalline compound is present in an amount of from about 0.5 to 10 and more preferably from about 0.5 to 5 percent by weight.

In preparing the blends of the present invention, the individual components are commonly provided in the form of chips or pellets. Each of the components is weighed separately, and then physically mixed together in any appropriate apparatus, e.g., a ball mill. The physical mixture is then dried at approximately 100° C. overnight or for a period of time of approximately 24 hours. The mixture is conveniently dried in a vacuum oven or in a circulating air oven, although any suitable apparatus may be used. The purpose of the drying step is to remove water from the physical mixture so as to prevent degradation of the blend. After the mixture of solid particles has been dried, the blend can then be prepared. A convenient method of forming the blend is melt extrusion. The extrusion apparatus thoroughly mixes the components in the melt and then extrudes the blend in the form of a strand which, upon solidification, can be broken up into chips or pellets.

The blend of the present invention is capable of undergoing melt processing at a temperature within the range of approximately 150° C. to 370° C. Preferably, the blend is capable of undergoing melt processing at a temperature within the range of approximately 200° C. to 320° C.

The blend of the present invention is useful as a molding resin, and especially for injection molding. The blend can also be used in the formation of fibers and films. It is to be understood that the term "film" as used herein includes any of the various thin, flat structures which may be known in the art as a sheet or film, etc. Articles molded from the blends of the present invention exhibit good mechanical properties, such as tensile strength, tensile modulus, flexural strength, flexural modulus, notched Izod impact strength, and heat deflection temperature.

A major benefit obtainable from the blends of the present invention is that the melt viscosity of the blends are considerably reduced relative to that of the polyolefin or polyester polymer alone thereby permitting lower processing temperatures and pressures to be used. Blends according to the invention may be produced which enable very substantial reductions in minimum processing temperatures, for example, 30° C. or more, to be achieved. Reduction in extrusion pressure results in more stable processing and longer filter pack life. In addition, greater productivity can be achieved as a result of increased extrusion speeds.

The extrusion apparatus used in connection with the present invention is not critical and may comprise any conventional extrusion apparatus. Examples of suitable extrusion apparatus are found, for example, in *Plastics Engineering Handbook of the Society of the Plastics Industry, Inc.*, fourth edition, edited by Joel Frados, Van Nostrand Reinhold Company (1976), pages 156–203.

Articles may also be molded from a molding compound which includes, as one component, the blend of the present invention. Such a molding compound incorporates into the blend of the present invention approximately 1 to 50 percent, and preferably approximately 10 to 30 percent by weight, based upon the total weight of the molding compound, of a solid filler and/or reinforcing agent. Representative fibers which may serve as reinforcing agents include glass fibers, asbestos, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool, and wood cellulose fibers, etc. Representative filler materials include calcium silicate, silica, clays, talc, mica, polytetrafluoroethylene, graphite, alumina trihydrate, sodium aluminum carbonate, barium ferrite, etc.

In order to form an article by injection molding from the present blend, or from a molding compound comprised of the present blend, the blend or molding compound is brought to the melt temperature of the blend, e.g., approximately 200° to 320° C., and is then injected into a mold cavity. The mold cavity is commonly maintained at a temperature less than approximately 100° C., e.g., approximately 90° C. to 100° C. The blend in the melt phase is injected into the mold cavity at a pressure of approximately 10,000 p.s.i. The cycle time (i.e., the time between injections) for the present blend commonly is about 10 to 40 seconds.

The invention is additionally illustrated in connection with the following Examples which are to be considered as illustrative of the present invention. It should be understood, however, that the invention is not limited to the specific details of the Examples.

EXAMPLE 1

A blend comprised of 90 percent by weight of high density polyethylene and 10 percent by weight of N,N'-bis(p-methoxybenzylidene)-alpha, alpha'-bi-p-toluidine was prepared by admixing the respective components in solid form in a Banber mixer wherein the components were heated to a temperature above their melting temperature and a blend formed.

The melt viscosity of both the blend and unmodified polyethylene were determined by capillary rheometry. The melt viscosity of the blend was reduced by about 25 percent over the shear rate range investigated.

EXAMPLE 2

The procedure of Example 1 was repeated with the exception that p-methoxycinnamic acid was employed as the liquid crystalline compound. A viscosity reduction of about 70 percent was achieved.

EXAMPLE 3

The procedure of Example 1 was repeated with the exception that N,N'-bis(4-octyloxybenzylidene)-p-phenylenediamine was employed as the liquid crystalline compound. A viscosity reduction of about 35 percent was achieved.

EXAMPLE 4

The procedure of Example 1 was repeated with the exception that lithium stearate was employed as the liquid crystalline compound. A viscosity reduction of about 25 percent was achieved.

EXAMPLE 5

A blend comprised of 90 percent by weight of polyethylene terephthalate and 10 percent by weight of N,N'-bis(p-methoxybenzylidene)-alpha, alpha'-bi-p-toluidine is prepared as in Example 1. The melt viscosity of the polyethylene terephthalate is similarly reduced.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A melt processable blend comprising a major amount of a melt processable polymer which is not capable of forming an anisotropic melt phase apart from the blend selected from the group consisting of a polyolefin and a polyester and a minor amount of a liquid crystalline compound having a molecular weight of less than about 1000 selected from the group consisting of N,N'-bis(p-methoxybenzylidene)-alpha, alpha'-bi-p-toluidine, p-methoxycinnamic acid, N,N'-bis(4-octyloxybenzylidene)-p-phenylenediamine, and mixtures thereof which is capable of forming an anisotropic melt phase apart from the blend at the melt processing temperature of the blend.

2. The blend of claim 1 which is capable of undergoing melt processing at a temperature within the range of approximately 150° to 370° C.

3. The blend of claim 1 wherein said polyolefin comprises alkylene units of 2 to 5 carbon atoms.

4. The blend of claim 3 wherein said polyolefin is polyethylene.

5. The blend of claim 1 wherein said liquid crystalline compound apart from said blend is capable of forming an anisotropic melt phase at a temperature below approximately 370° C.

6. The blend of claim 1 wherein said melt processable polymer is present in an amount ranging from about 50 to 99.5 percent by weight based on the weight of the blend.

7. The blend of claim 1 wherein said liquid crystalline compound is present in an amount ranging from about 0.5 to about 50 percent by weight based on the weight of the blend.

8. The blend of claim 7 wherein said liquid crystalline compound is present in an amount of less than about 10 percent by weight.

9. The blend of claim 7 wherein said liquid crystalline compound is present in an amount of less than about 5 percent by weight.

10. The blend of claim 1 wherein said polyester is poly(ethylene terephthalate).

11. The blend of claim 1 further comprising approximately 1 to 50 percent by weight of a solid filler and/or reinforcing agent based on the weight of the blend.

12. The blend of claim 1 further comprising approximately 10 to 30 percent by weight of a solid filler and/or reinforcing agent based on the weight of the blend.

13. A molded article comprised of the blend of claim 1.

14. A fiber which has been melt spun from the blend of claim 1.

15. A film which has been melt extruded from the blend of claim 1.

16. An improved method for the melt extrusion of a polymer which is not capable of forming an anisotropic melt phase apart from the blend selected from the group consisting of a polyolefin and a polyester by which the melt viscosity of the polymer is reduced comprising providing a blend which comprises a major amount of said polymer and a minor amount of a liquid crystalline compound having a molecular weight below about 1000 selected from the group consisting of N,N'-bis(p-methoxybenzylidene)-alpha,alpha'-bi-p-toluidine, p-methoxycinnamic acid, N,N'-bis(4-octyloxybenzylidene)-p-phenylenediamine, and mixtures thereof which is capable of forming an anisotropic melt phase apart from the blend at the melt processing temperature of the blend and extruding said blend.

17. The method of claim 16 wherein said blend is capable of undergoing melt processing at a temperature within the range of approximately 150° to 370° C.

18. The method of claim 16 wherein said polyolefin comprises alkylene units of 2 to 5 carbon atoms.

19. The method of claim 18 wherein said polyolefin is polyethylene.

20. The method of claim 16 wherein said liquid crystalline compound apart from said blend is capable of forming an anisotropic melt phase at a temperature below approximately 370° C.

21. The method of claim 16 wherein said melt processable polymer is present in an amount ranging from about 50 to 99.5 percent by weight based on the weight of the blend.

22. The method of claim 16 wherein said liquid crystalline compound is present in an amount ranging from about 0.5 to about 50 percent by weight based on the weight of the blend.

23. The method of claim 22 wherein said liquid crystalline compound is present in an amount of less than about 10 percent by weight.

24. The method of claim 22 wherein said liquid crystalline compound is present in an amount of less than about 5 percent by weight.

25. The method of claim 16 wherein said polyester is poly(ethylene terephthalate).

26. The method of claim 16 wherein said blend further comprises approximately 1 to 50 percent by weight of a solid filler and/or reinforcing agent based on the weight of the blend.

27. The method of claim 16 wherein said blend further comprises approximately 10 to 30 percent by weight of a solid filler and/or reinforcing agent based on the weight of the blend.

28. The blend of claim 1 wherein said liquid crystalline compound is N,N'-bis(p-methoxybenzylidene)-alpha,alpha'-bi-p-toluidine.

29. The method of claim 16 wherein said liquid crystalline polymer is N,N'-bis(p-methoxybenzylidene)-alpha,alpha'-bi-p-toluidine.

* * * * *